March 22, 1938.   V. W. KLIESRATH   2,112,101
VEHICLE
Filed Sept. 17, 1934   4 Sheets-Sheet 2

INVENTOR.
Victor W. Kliesrath
BY
ATTORNEY.

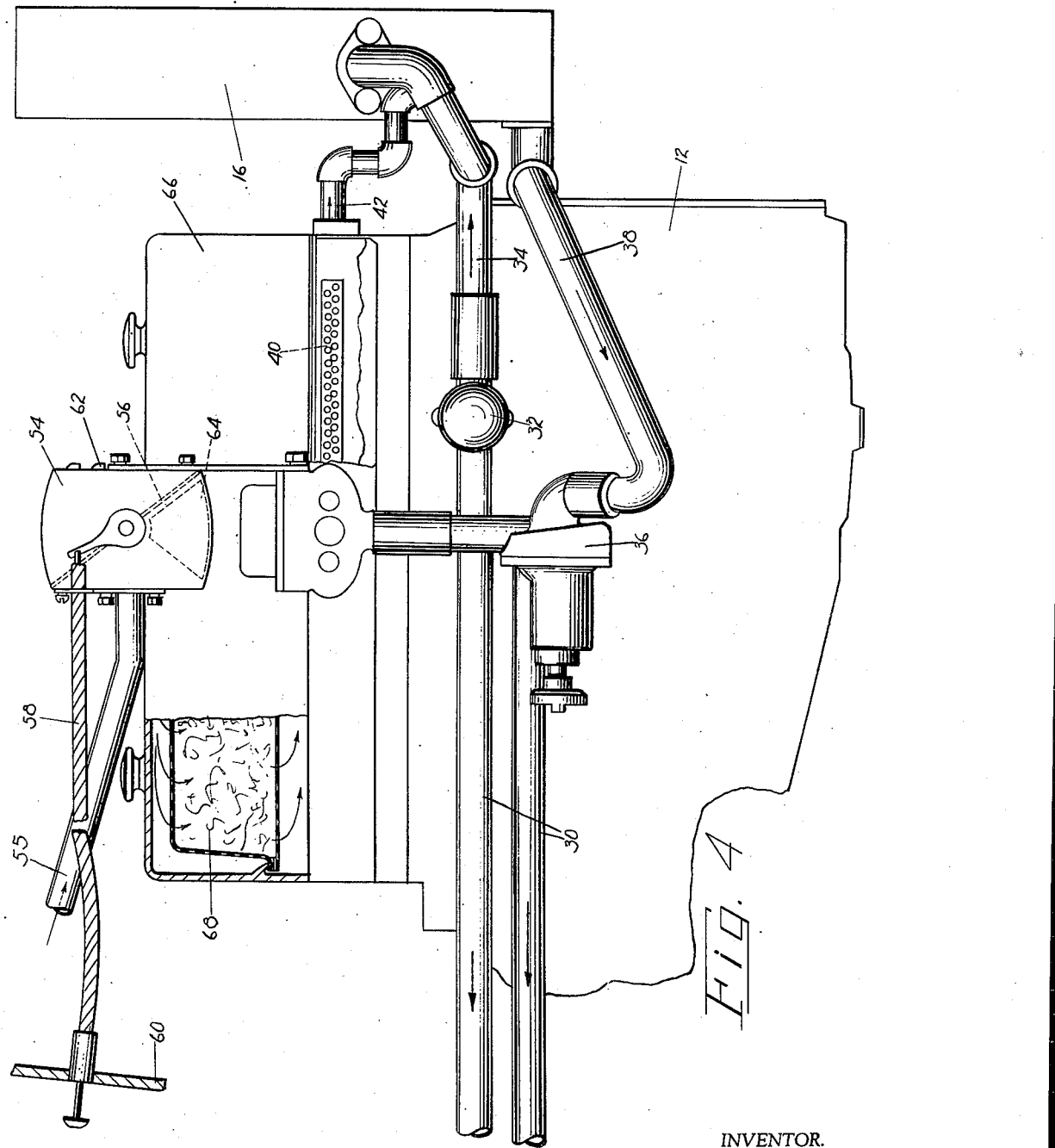

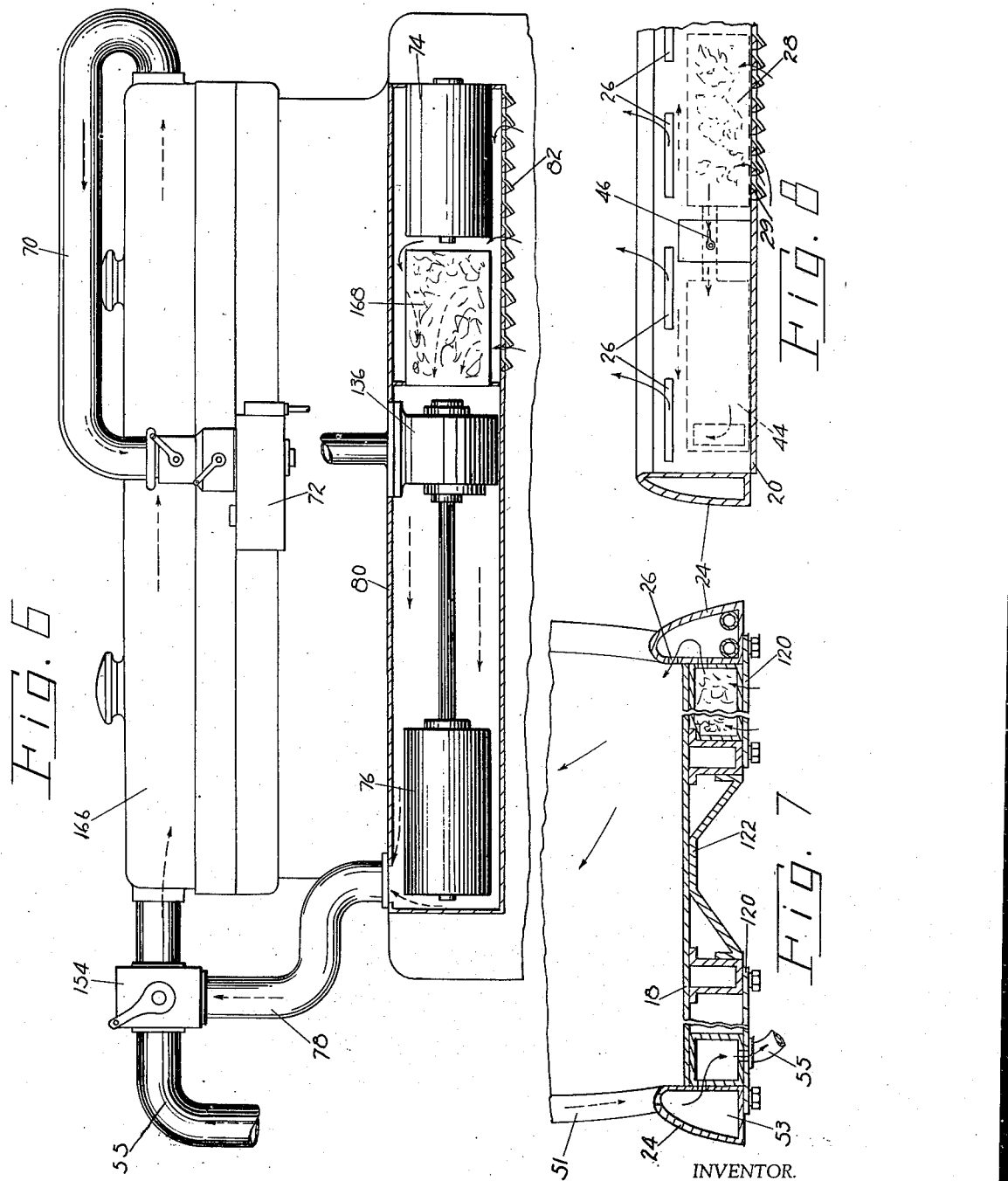

Patented Mar. 22, 1938

2,112,101

UNITED STATES PATENT OFFICE 2,112,101

VEHICLE

Victor W. Kliesrath, South Bend, Ind., assignor to The Steel Wheel Corporation, Chicago, Ill., a corporation of New York Application September 17, 1934, Serial No. 744,303

3 Claims. (Cl. 98—2)

This invention relates to vehicles, and is illustrated as embodied in an automobile having a novel ventilating system.

An object of the invention is to provide a simple and inexpensive, but positive and effective, system for circulating air through the vehicle body, preferably under the control of the driver or other occupant. I prefer to provide also means for controlling the temperature of the air so circulated, and also for cleaning it.

In one desirable arrangement, the body comprises in its base or floor section a plurality of longitudinally-extending hollow frame members, shown arranged along the sides of the body. Air is taken into these members, preferably through a novel cleaning device arranged adjacent and between these side members between the floor and bottom plates of the floor section, and is discharged into the body through openings adjacent the tops of the hollow side members.

One feature of the invention relates to heating or cooling the air so introduced into the body, to control its temperature.

Many of the advantages of the invention can be secured by causing circulation of the air by means of openings at the top of the body which communicate with the exterior of the body at a point where there is a low pressure area when the vehicle is in motion. However, one of the principal features of the invention relates to the use of engine-driven means for positively circulating the air.

In one effective arrangement, a valve or other control device (preferably adjustable by the driver from within the body) is arranged to proportion the air withdrawn from the upper part of the body to air taken from the space under the hood. In the arrangement illustrated, the air so obtained is passed through an air cleaner arranged to transmit cleaned air to the interior of a hollow cover for the top of the engine. The air is thereby circulated across and over the spark plugs and other devices mounted on the top of the engine, to keep them cool, and is then directed to the air intake of the engine carbureter.

According to one feature of the invention, the air taken from beneath the hood is taken from an enclosure which houses the generator and other accessories, thereby circulating a current of air over them and keeping them cool.

The above and other objects and features of the invention, including various novel combinations of parts of desirable particular constructions, will be apparent from the following description of the illustrative embodiments shown in the accompanying drawings, in which:

Figure 4 is a side elevation, partly broken away, of the engine and the parts associated therewith;

Figure 5 is a diagram of a modification;

Figure 6 is a side elevation of a modification in which the air is taken from a housing enclosing the engine driven accessories;

Figure 7 is a partial vertical transverse section through one of the front door posts; and Figure 8 is a partial longitudinal section showing the use of "dry ice" for cooling.

Figure 1:
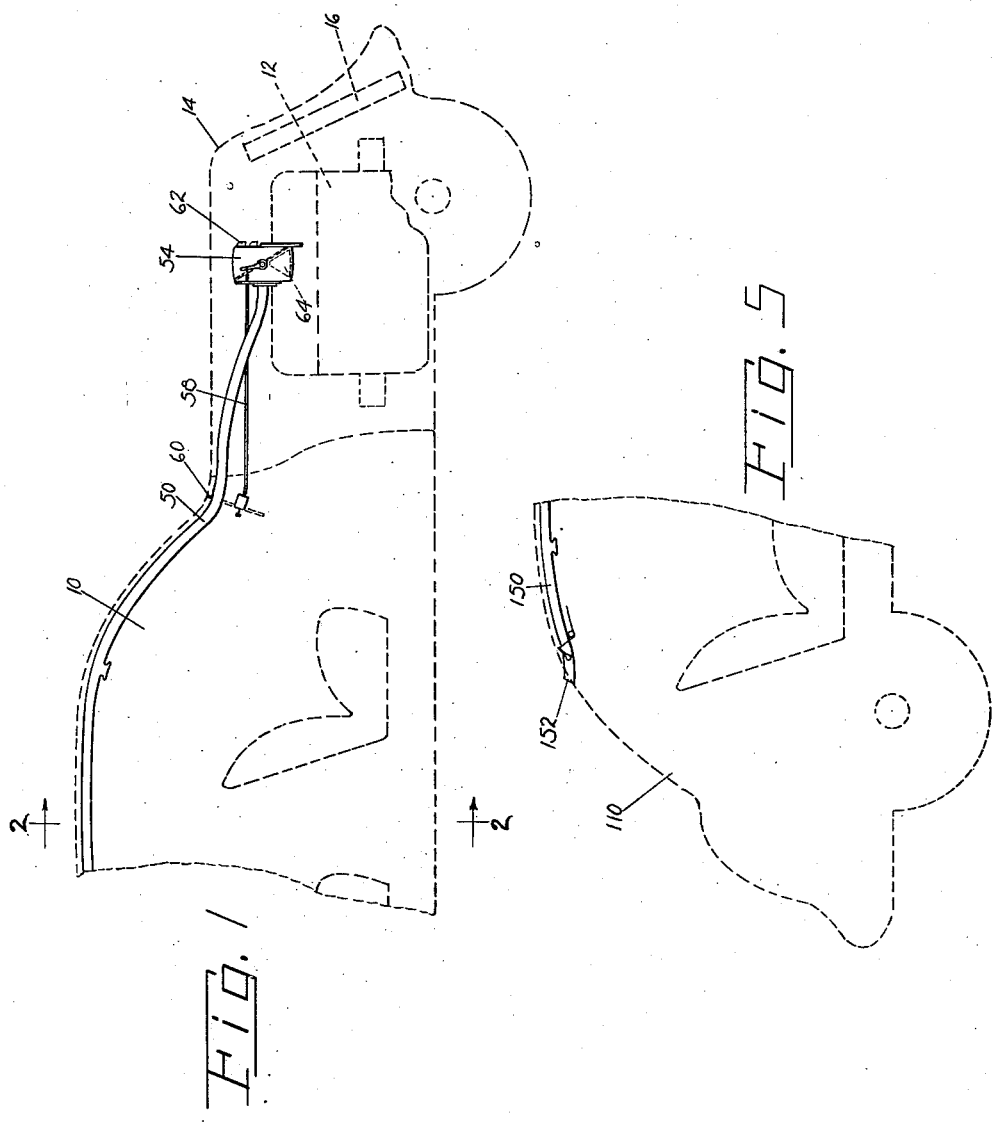
Figure 1 is a diagrammatic longitudinal section through an automobile provided with my novel air-circulating system.

The automobile illustrated diagrammatically in Figure 1 includes a body 10, the floor section of which is reinforced to form a substitute for the usual frame as fully described in my application No. 718,929, filed April 4, 1934, now Patent No. 2,100,561, patented Nov. 30, 1937, and which has an engine 12 arranged under a hood 14. The engine may be, and is shown as being, of the construction described in my application No. 739,622, filed August 13, 1934. The engine is shown arranged behind a radiator 16 in the front end of the hood.

Figure 2:
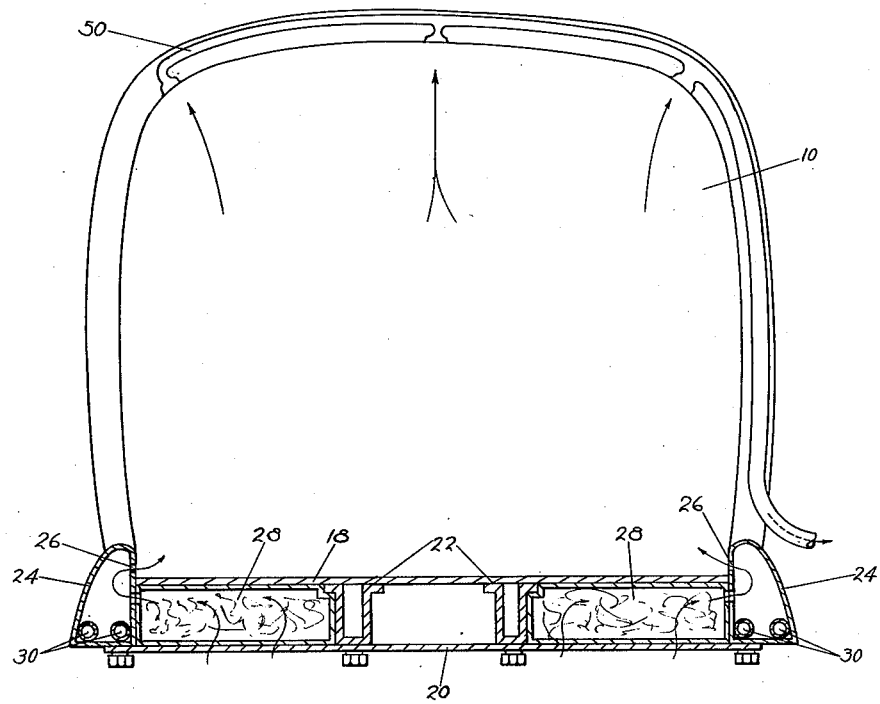
Figure 2 is a transverse vertical section through the body of the vehicle, on the line 2—2 of Figure 1.

The floor section of the body is formed of vertically-spaced horizontal floor and bottom plates 18 and 20 (Figures 2 and 3) embracing suitable frame or reinforcing elements 22 between them as described in my said application No. 718,929, and has hollow longitudinally-extending side members 24 which project above the floor plates 18 and are formed with slots or other openings 26 communicating with the interior of the body.

Figure 3:
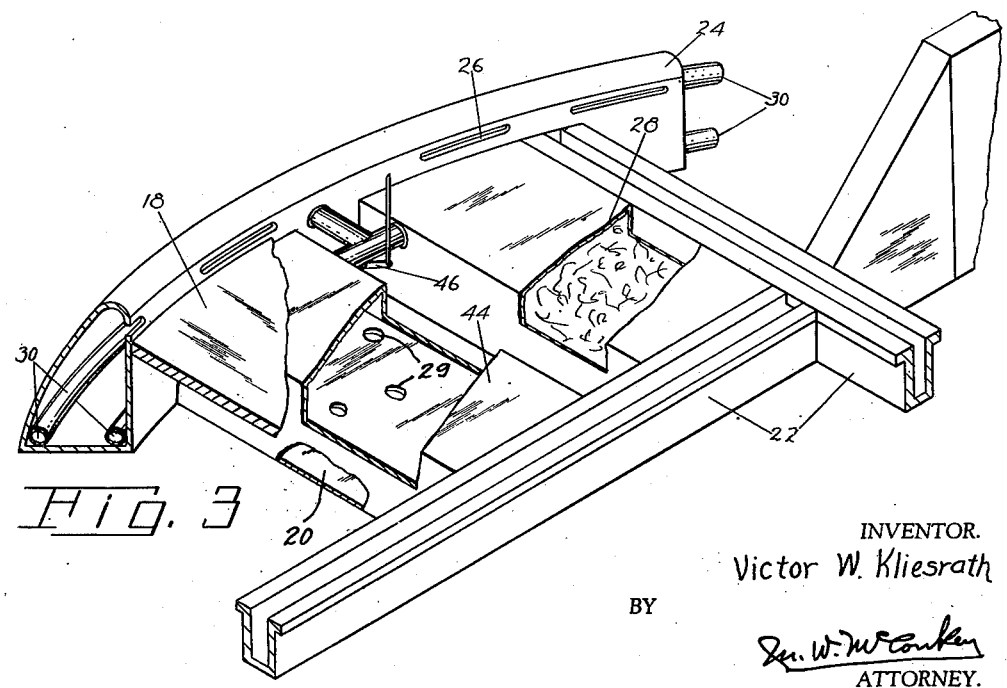
Figure 3 is a partial perspective view, partly broken away, of the floor section of the body.

Between the floor and bottom plates 18 and 20 adjacent the hollow members 24, and communicating with the interior thereof, are shown air-cleaning devices such as boxes 28 containing metal floss or other cleaning material. Air enters the bottom of the cleaning devices 28 through suitable louvered openings 29 in the bottom plates 20 (Figures 3 and 8). Sections of the bottom plates 20 may be made readily removable, to facilitate replacement of the cleaning devices 28.

The air entering through the hollow side members may, if desired, be heated in the winter time by hot water pipes 30, shown arranged in the interior of the hollow members. As shown in Figure 4, the intake end of the pipes 30 is connected to the water jacket of the engine 12, for example through a suitable valve 32 which also controls a conduit 34 serving as a water return to the radiator 16.

The valve 32 may be set to shut off all the water from the pipes 30 and send it all through the return 34, or it may be set to divert part of it into the pipes 30. The return end of the pipes 30 is shown connected to a water pump 36 which circulates the returned water, as well as cooled water from a conduit 38 from the radiator, through a perforated pipe 40 which sprays the cooled water into the uppermost part of the water jacket, above the engine cylinders.

As explained in my said application No. 739,622, normally the engine is cooled by the circulation of water sprayed into the jacket by pipe 40 and returned to the radiator through conduit 34. If, however, the engine temperature rises too high, some steam is formed, and this steam escapes through a conduit 42 which conducts it to the radiator 16, where it condenses. If desired, part of the steam space in the upper part of the water jacket may be protected from the spray from pipe 40, and steam withdrawn therefrom to circulate through the pipes 30 instead of hot water.

In the summer, the air entering the body may, if desired, be cooled by passing it through boxes 44 containing ice or solid carbon dioxide or other refrigerant. As shown in Figure 3, when this is done a suitable valve 46 is operated so that the cleaned air is discharged from the cleaner 28 into the cooler 44 instead of directly into the member 24.

Figure 8 shows diagrammatically this arrangement for cooling. With the valve 46 in the position shown the air passes from the cleaner 28 through the dry ice in 44 and thence into the hollow member 24. By shifting the valve 46 downwardly into a vertical position, the air passes directly into the hollow member 24 from the air cleaner.

Many of the advantages of the invention can be secured, as shown in Figure 5, by causing air circulation through the body by means such as air conduits 150 concealed in the roof, and having openings communicating with the space in the upper part of the body, and which open on the outside of the body at a point where there is a low pressure area when the vehicle is in motion. In the arrangement shown in Figure 5, this outside opening is at 152, just above the rear window and just below the point at which the roof merges into the rear of the car body. At this point there is normally such a low pressure area when the vehicle is in motion. Suitable valves or shutters may be provided for conduits 150 to control the air circulation.

I prefer, however, to provide engine operated means for positively circulating the air. As shown in Figures 1, 2, 4 and 7, conduits 50 concealed in the roof, and having openings communicating with the interior of the body, may be led down the front door post 51 at one side of the windshield as shown in Figure 7, and connected to an air mixing or control device 54 through a suitable conduit 55. The conduit 50 may be directly connected to the control device 54 as shown in Figure 1. If preferred, the conduit 50 may open into a hollow vertical support such as the hollow door post 51 which may be arranged to open into a hollow closed off air-box 53 formed at the front end of one of the side members 24, and the air-box 53 may then be arranged to open through an adjacent hollow reinforcing element 22 into the conduit 55, all as shown in Figure 7.

As shown in Figure 4, the control device 54 preferably comprises a valve or shutter 56, operable by the driver from within the body by means of a Bowden control 58 or the like having its end mounted on the instrument board 60.

The valve 56 can thus be set in different positions, to proportion the air taken from conduits 50 and that taken in from the space under the hood through louvered openings 62.

The air so taken into the device 54 passes through an opening 64 into the top of a cover 66 mounted on the top of the engine. Thence it passes down through an air cleaner 68, and circulates over the spark plugs and other parts mounted on the top of the cylinder head, to aid in keeping them cool. Thence it is conducted, by suitable conduits, to the air intake of the engine carbureter (not shown). Thus the engine suction is utilized to cause a positive circulation of air through the body.

Figure 7 also illustrates an alternative construction, according to which the bottom plate 20 is replaced by two side plates 120 and an intermediate reinforcing element 122 which also serves as an inverted channel extending lengthwise of the car and increasing the clearance at the center line of the car.

Figure 6 shows diagrammatically how the air from under the hood may be transmitted by a conduit 78 to a valve 154 corresponding to the valve 54, from the rear end of a cover 80 enclosing and housing engine-driven accessories such as a generator 76 and a pump 136, together with a starter indicated diagrammatically at 74. The air may here be additionally cleaned by passing through cleaning material 168. The air is taken in through louvered openings 82, which may open to the space alongside the engine or, if preferred may open downwardly into the crankcase.

In this case, the air passes from valve 154 into the cover 166, where it first passes through the cleaner 68 and then sweeps forwardly the whole length of the engine into a conduit 70 which curves rearwardly from the front end of cover 166 to connect with the air intake of a downdraft carbureter 72.

While illustrative constructions have been described in detail, it is not my intention to limit the scope of the invention to those particular constructions, or otherwise than by the terms of the appended claims.

I claim:

1. A vehicle having a body provided with hollow longitudinally-extending frame members having air outlets inside the body, a floor supported by said frame members intermediate their height and below said air outlets, and means for cleaning air and supplying it to said members.

2. A vehicle having a body provided with hollow longitudinally-extending frame members having air outlets inside the body, horizontal bottom and floor plates secured to said members in vertically-spaced relationship, said floor plate lying below the top of said members and below said air outlets, and air-cleaning means arranged in the space between said bottom and floor plates and discharging into said hollow frame members.

3. A vehicle having a body provided with hollow longitudinally-extending frame members having air outlets inside the body, a floor supported by said frame members intermediate their height and below said air outlets, means for supplying air to said members, and means inside said members for varying the temperature of the air.

VICTOR W. KLIESRATH.